(12) United States Patent
Beauvais et al.

(10) Patent No.: US 8,913,102 B2
(45) Date of Patent: Dec. 16, 2014

(54) TELECONFERENCING METHOD AND DEVICE

(75) Inventors: Mathieu Beauvais, Nozay (FR); Ryan Skraba, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 174 days.

(21) Appl. No.: 13/805,566

(22) PCT Filed: Jun. 21, 2011

(86) PCT No.: PCT/EP2011/060278
§ 371 (c)(1),
(2), (4) Date: Mar. 6, 2013

(87) PCT Pub. No.: WO2012/000826
PCT Pub. Date: Jan. 5, 2012

(65) Prior Publication Data
US 2013/0169743 A1     Jul. 4, 2013

(30) Foreign Application Priority Data

Jun. 30, 2010    (FR) ..................................... 10 02769

(51) Int. Cl.
*H04N 7/14*      (2006.01)
*H04N 7/15*      (2006.01)
*H04L 12/18*     (2006.01)

(52) U.S. Cl.
CPC .............. *H04N 7/15* (2013.01); *H04L 12/1827* (2013.01); *H04L 12/1831* (2013.01)
USPC .................... 348/14.07; 348/14.08; 348/14.09

(58) Field of Classification Search
USPC ........... 348/14.01, 14.07, 14.08, 14.09, 14.11
See application file for complete search history.

(56) References Cited

U.S. PATENT DOCUMENTS

| 6,744,460 B1 | 6/2004 | Nimri et al. |
| 2005/0099492 A1 | 5/2005 | Orr |

(Continued)

OTHER PUBLICATIONS

Ryan Skraba et al., "Developing Compelling Social-Enabled Applications with Context-based Social Interaction Analysis," Advances in Social Network Analysis and Mining, IEEE, XP031525687, pp. 206-211, Jul. 20, 2009.

(Continued)

*Primary Examiner* — Binh Tieu
(74) *Attorney, Agent, or Firm* — Fay Sharpe LLP

(57) ABSTRACT

A teleconferencing method for a teleconferencing device (1), the device combining multiple individuals (21, 22, 23, 24) in different location (11, 12, 13) over a communication network (31), the device comprising at least one sensor (3, 4, 5) per location and at least one audio and/or visual playback means (2) per location, the teleconferencing method comprising the following steps:

Figure 1:
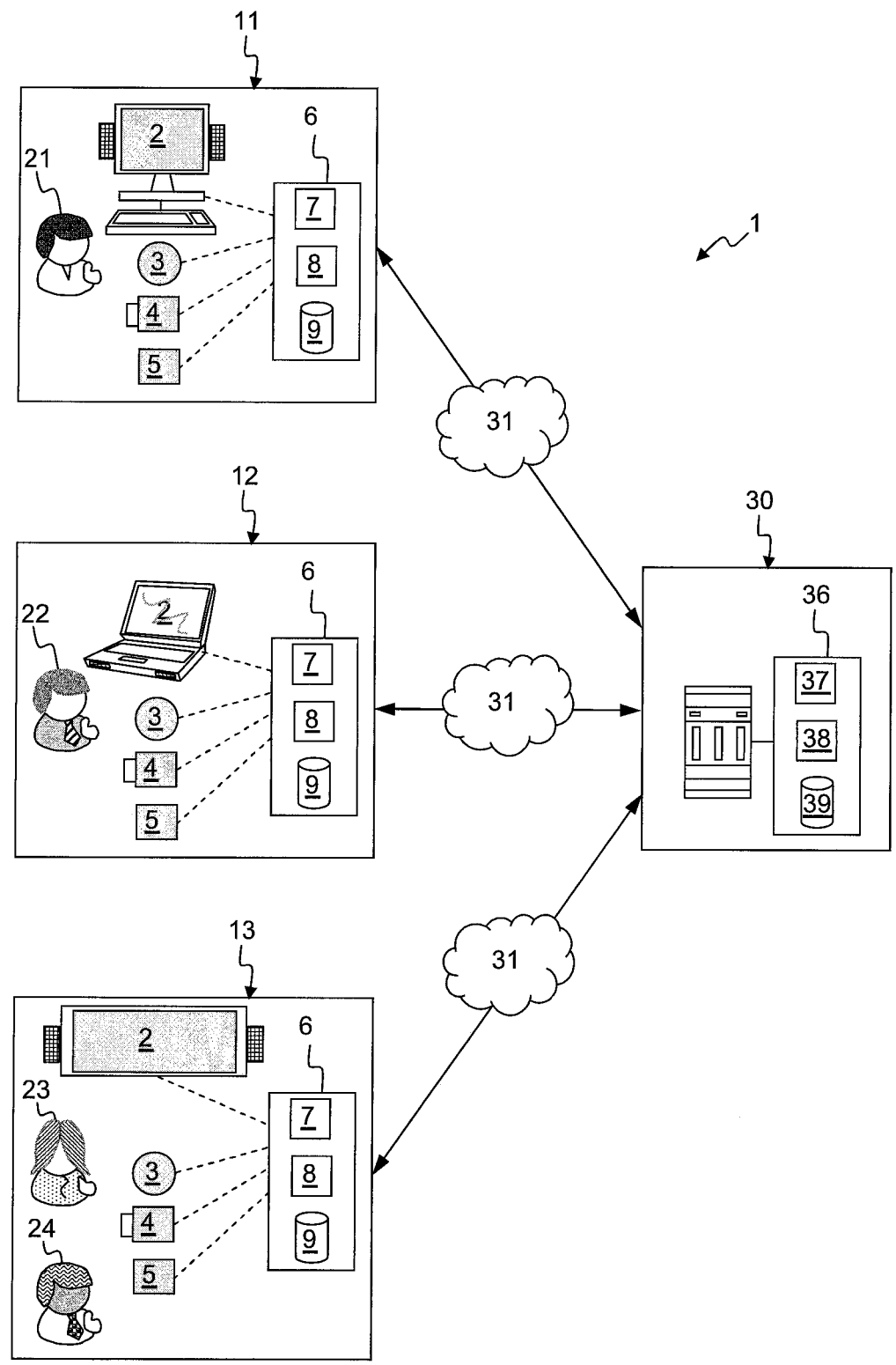

assigning multiple interaction counters (41, 42, 43, 44) to each of the individuals (21, 22, 23, 24) participating in the teleconference, each interaction counter (41, 42, 43, 44) characterizing interactions (70) between a specific individual and a third-party individual;

estimating the interactions (70) between the specific individual and the third-party individual based on a measurement of the sensors (3, 4, 5) of the specific individual's location or the third-party individual's location;

altering a value of the interaction counter (41, 42, 43, 44) corresponding to the interaction (70) between the specific individual and the third-party individual resulting from the step of estimating the interactions, and saving the value of the interaction counter (41, 42, 43, 44);

selecting the data streams (66, 67, 68) to be presented to each individual (21, 22, 23, 24) participating in the conference, the data stream presented to a specific individual being related to at least one third-party individual and selected based on the values of the interaction counters (41, 42, 43, 44) in comparison to a threshold defined by the specific individual; and presenting the data flow to each individual participating in the teleconference by way of the audio and/or visual playback means (2).

9 Claims, 3 Drawing Sheets

(56) References Cited

U.S. PATENT DOCUMENTS

2006/0210045 A1* 9/2006 Valliath et al. ........... 379/202.01
2008/0088698 A1* 4/2008 Patel et al. ................ 348/14.09
2008/0266379 A1* 10/2008 Hubenthal et al. ......... 348/14.08
2013/0204675 A1* 8/2013 Dobell ........................ 705/7.42

OTHER PUBLICATIONS

International Search Report for PCT/EP2011/060278 dated Jul. 14, 2011.

* cited by examiner

TELECONFERENCING METHOD AND DEVICE

One aspect of the invention pertains to a teleconferencing method. Another aspect of the invention pertains to a teleconferencing device. Such a method and such a device have a particular but non-exclusive application in teleconferencing, especially for videoconferencing between individuals in different locations.

Videoconferencing devices are known in which individuals participating in the videoconference are shown either a combination of video signals from all locations where the individuals are located, or video signals from a specific location where one particular individual is located. In the first case, the combination of video signals is hard to use, because it is nearly impossible to identify the individual who is speaking, particularly when the number of individuals and locations expands and the display screen is subdivided into separate sections for each participating individual and/or location. In the second case, each individual manually selects the video signal that corresponds to the individual or location that he or she wishes to view. This is tedious and inefficient for an individual actively participating in the videoconference. Thus, the videoconferencing device may select and display the video signal corresponding to an individual who is speaking or to a location that is emitting the most noise based on measurements from sound sensors. However, such a device does not take into account body language, meaning nonverbal behavior such as individuals' gestures and facial expressions that may be considered relevant and unique to each individual viewing the video signal shown to him or her by the videoconferencing device.

One purpose of the invention is to propose a teleconferencing method between individuals in different locations that remedies at least one of the shortcomings of the prior art.

According to a first aspect, a teleconferencing method is proposed for a teleconferencing device, the device connecting multiple individuals in different locations through a communication network, the device comprising at least one sensor per location and at least one audio and/or visual playback means per location, the teleconferencing method comprising the following steps:

assigning multiple interaction counters to each of the individuals participating in the teleconference, each interaction counter characterizing the interactions between a specific individual and a third-party individual;

estimating the interactions between a specific individual and the third-party individual based on a measurement of the sensors of the location of the specific individual and the location of the third-party individual;

altering a value of the counter relevant to the interaction between the specific individual and the third-party individual resulting from the step of estimating the interactions, and saving the counter's value;

selecting the data flow to be presented to each individual participating in the conference, the data flow presented to a specific individual being related to at least one third-party individual and selected based on the values of the interaction counters in comparison to a threshold defined by the specific individual; and presenting the data flow to each individual participating in the teleconference by way of the audio and/or visual playback means.

Advantageously, the values assigned to the counters persist over time, particularly from one conference to another.

The value of one counter may be representative of the existing social connection between a specific individual and the third-party individual.

The method may further comprise a step of altering a value of the counter relevant to the interaction between the specific individual and the third-party individual resulting from interactions measured by social connection services accessible over the Internet outside the context of the conference.

The step of selecting data flows may consist of selecting the data flow related to a third-party individual corresponding to a highest interaction counter value.

The step of selecting data flows may consist of selecting the data flow related to a third-party individual corresponding to a lowest interaction counter value.

The threshold may be defined in the specific individual's preferences.

According to another aspect, a teleconferencing device is proposed that connects multiple individuals in different locations over a communication network, the device comprising at least one sensor per location and at least one audio and/or visual playback means per location, and a centralized or distributed control and processing entity, the control and processing entity implementing the inventive teleconferencing method.

According to another aspect, a computer program product is proposed that is intended to be loaded in a memory of a centralized or distributed control and processing entity of a teleconferencing device, the computer program product comprising portions of software code implementing the inventive teleconferencing method whenever the program is executed by the control and processing entity.

The invention therefore makes it possible to make videoconferencing as natural as a face-to-face meeting in which all individuals are in a single location, for example in the same conference room. The invention makes it possible to account for the fact that a videoconference is never an isolated event. The invention also makes it possible to account for the fact that during a videoconference, there is never only a single interesting aspect to listen to or watch; rather, multiple interesting aspects are taking place at the same time. Finally, with the invention, it is possible to account for the social history of each individual participating in the conference and for the past interactions between the individuals that may have an impact on later conferences. All of this enables effective communication and collaboration between the individuals participating in the videoconference.

Other advantages will become clear from the detailed description of the invention that follows.

Figure 2:
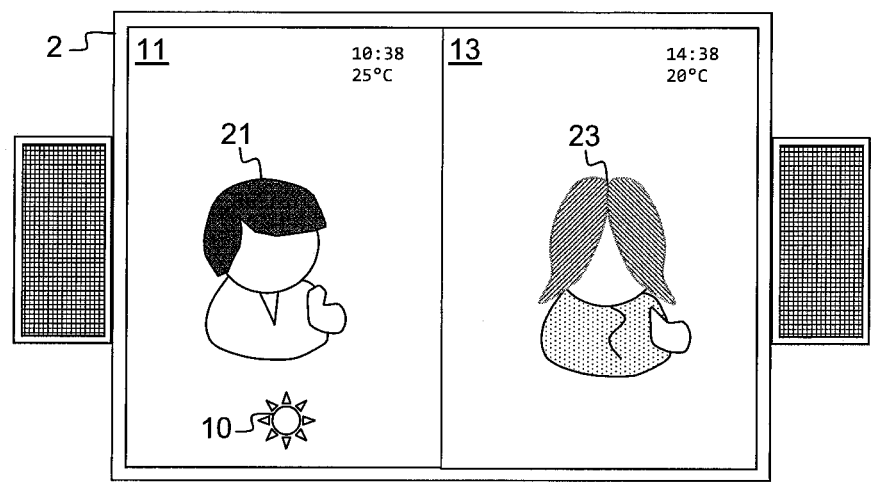
Figure 3:
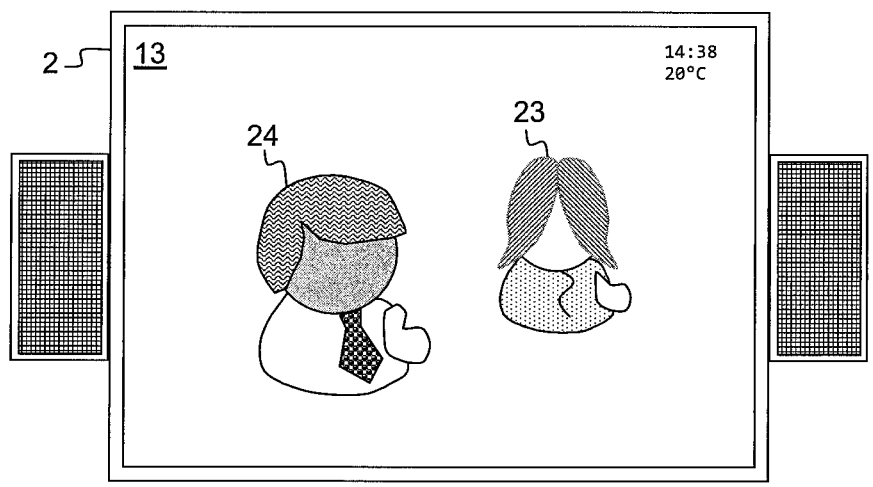
Figure 4:
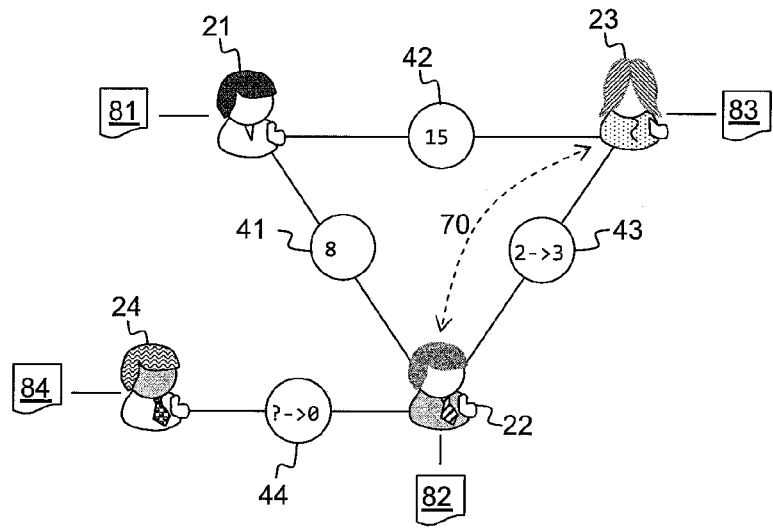
Figure 5:
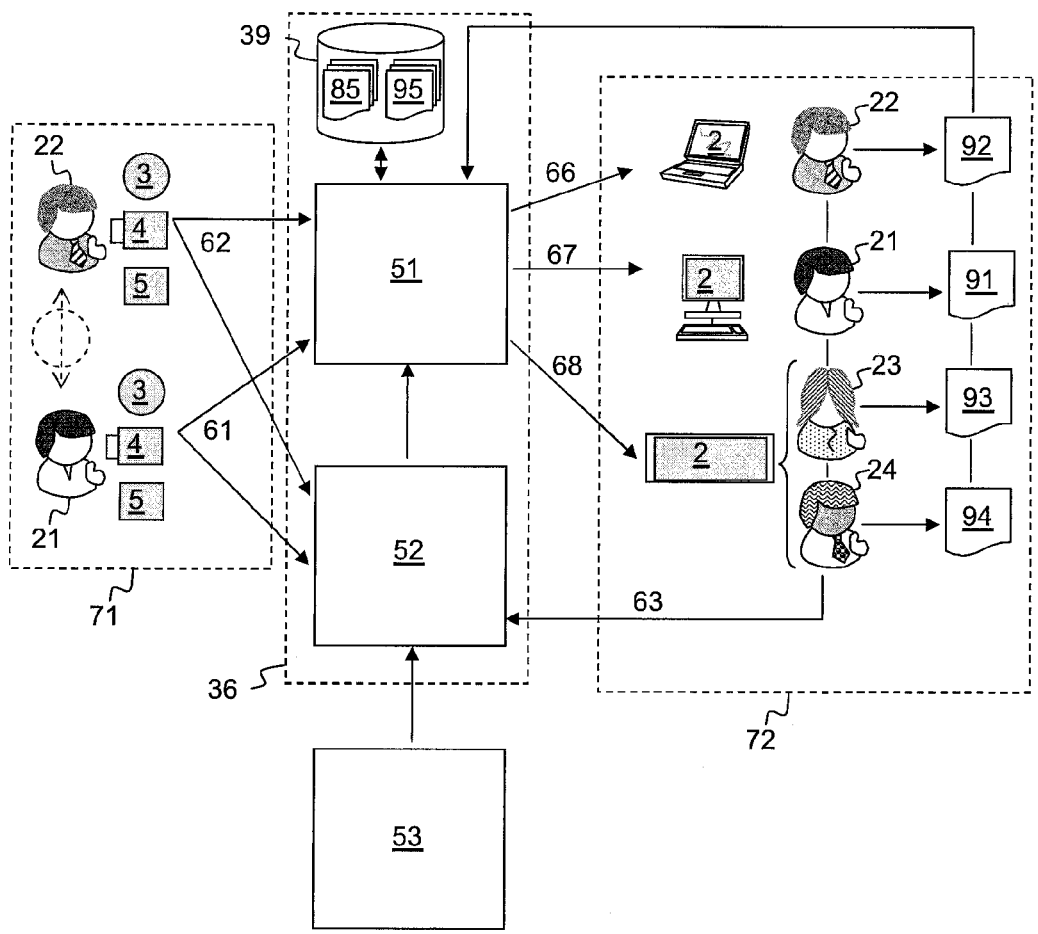

The present invention is depicted by nonlimiting examples in the attached Figures, in which identical references indicate similar elements:

FIG. 1 schematically depicts a teleconferencing device between individuals in different locations;

FIG. 2 schematically depicts a screen subdivided into multiple parts that make it possible to present multiple data flows to an individual;

FIG. 3 schematically depicts a screen that makes it possible to present a single data stream to an individual;

FIG. 4 is a diagram schematically illustrating the existing interactions between different individuals participating in a teleconference; and FIG. 5 schematically depicts the operation of the teleconferencing device during a conference.

FIG. 1 schematically depicts a teleconferencing device 1 between individuals in different locations.

A first individual 21 is at a first location 11. A second individual 22 is at a second location 12. A third and fourth individual, respectively 23 and 24, are at a third location 13. These individuals together initiate a videoconference.

Each of the locations in which the individuals participating in the conference are located has an audio and/or visual playback means 2, multiple sensors 3, 4, 5, and a local processing unit 6. The sensors comprise, for example, a microphone 3, a video camera 4, and optionally additional sensors 5. The video camera may be motorized. It may also be multiple video cameras in a single location, in particular when multiple individuals may be present in a single location. The additional sensors 5 may be any type of sensor that makes it possible to measure one or more parameters related to the location and the individual(s) located there, for example a temperature, humidity, ambient light, and/or motion detection sensor, etc. The audio and/or video playback means 2 may be a screen combined with speakers, for example a desktop or laptop micro-computer monitor, or a video projector. The local processing unit 6 may be a micro-computer or a specific teleconferencing device comprising a processor 7, a modem 8, and a memory 9. The modem 8, whether wired or wireless, allows connection to a communication network 31. The communication network 31 may be a global communication network like the Internet, or a private communication network, like an intranet.

The teleconferencing device 1 further comprises a control and processing entity 30. The control and processing entity may be constructed in the form of a specific teleconferencing server 36 comprising a processor 37, a modem 38, and a memory 39. The server 36 implements the teleconferencing method. The server is connected by means of the modem 38 and the communication network 31 to the various local processing units 6 of the locations where individuals have initiated participation in the conference.

A computer program product may be loaded into the memory 39 of the server 36 of the processing and control entity 30. In such a case, the computer program product implements the teleconferencing method whenever the program is executed by the processor 37.

The function of the local processing unit 6 is to generate a data flow comprising an audio signal and a video signal that may be combined with the parameters measured by additional sensors based on the output signals of the sensors 3, 4, 5, the data flows being related to a particular individual, for example 21, 22, 23, 24 in a particular location, for example 11, 12, 13. This data stream is transmitted to the control and processing entity 30.

The function of the control and processing entity 30 is to select the data stream(s) that relate to one or more individuals (designated third-party individuals) who will be presented to another individual (designated the specific individual) based on the preferences of that specific individual. The selected data stream is presented to the specific individual on his or her audio and/or visual playback means 2, meaning that the video signal is viewed by way of the screen and the audio signal is broadcast by way of the speakers. In this way, the control and processing entity 30 enables effective use of the bandwidth that is necessarily limited within the local processing units 6 by transmitting only the relevant data stream for each individual located in remote locations.

FIGS. 2 and 3 schematically depict a screen 2 that allows the presentation of the data stream received by the local processing unit 6 of a specific individual, for example the individual 22 at a location 12.

More specifically, FIG. 2 depicts a first example in which the screen 2 is subdivided into two parts. This enables the individual 22 to receive a data stream that particularly combines multiple video signals. In the left-hand part of the screen, the video signal related to the individual 21 at the location 11 is presented. In the right-hand part of the screen, the video signal related to the individual 23 at the location 13 is presented. A graphical element 10 associated with one of the screen's parts may also indicate to the individual 22 the location where the audio signal currently being played by the speakers is coming from. Naturally, the screen may be subdivided into four or more parts, and allow the viewing of a complex data stream comprising a plurality of video and audio signals.

FIG. 3 depicts a second example in which the screen 2 enables the individual 22 to receive a single data stream, for example to view the video signal and to hear the audio signal related to the individuals 23 and 24 at a location 13.

In both examples, other parameters included in the data stream may also be presented in the form of insets on the screen (local time, temperature, etc. of the presented location).

FIG. 4 is a diagram schematically depicting the existing interactions between different individuals who may participate in a teleconference. In this example, three individuals 21, 22 and 23 have already interacted together in the past. A new individual 24 starts interacting with at least one individual, for example 22, for the first time. Each of the individuals participating in the teleconference are assigned multiple interaction counters. Each interaction counter characterizes the interactions between a specific individual and a third-party individual. The first individual 21 has already had an average number of interactions with the second individual 22, and the value of the corresponding interaction counter 41 is 8. The first individual 21 has already had a high number of interactions with the third individual 23, and the value of the corresponding interaction counter 42 is 15. The second individual 22 has already had a low number of interactions with the third individual 23, and the value of the corresponding interaction counter 43 is 2. The fourth individual 24 has had no past interaction with the second individual 22, and the corresponding interaction counter 44 is not filled out; a value of zero may be assigned to it.

An interaction counter's value evolves as interactions occur. For instance, interaction 70 (illustrated by a dashed double arrow) of the second individual 22 with the third individual 23 causes the interaction counter 43 for those two individuals to be incremented from value 2 to value 3.

Thus, the value of an interaction counter is representative of the degree of knowledge, or of the extent of the social connections between two individuals.

All interactive counters related to the interactions of a specific individual with third-party individuals and their corresponding values are saved in a corresponding file. For example, the interaction counters and their corresponding values for the first individual 21 are saved in a first data set 81, those of the second individual 22 are saved in a second data set 82, those of the third individual 23 are saved in a third data set 83, and those of the fourth individual 24 are saved in a fourth data set 84. The interaction counters and their corresponding values are saved persistently, meaning that they are not reset, so that they can be reused from one conference to another.

As an alternative, multiple interaction counters may be provided between two individuals, for example a general interaction counter and one or more specific interaction counters. The general interaction counter is intended to count all interactions between two individuals. Each specific interaction counter may be limited to counting the interactions between two individuals in the context of a particular topic, such as "Monday departmental meetings" or "green technology meetings".

FIG. 5 schematically depicts the operation of the teleconferencing device during a teleconference.

During the conference, some individuals are active 71, in the sense that they are actors by actively and directly interacting with one another, for example in the form of a discussion. Other individuals are passive 72, in the sense that they are listeners who watch and listen to the data streams presented to them. Naturally, the active or passive status is not fixed, and changes over the course of a teleconference.

The teleconferencing device comprises an interaction counter management and selection module 51 and calculation module 52. These may be portions of software code executed by the processor of the server 36.

The function of the management and selection module 51 is to manage the interaction counters' databases and the users' preferences, as well as the selection and presentation of relevant data streams to individuals.

The function of the calculation module 52 is to calculate the interactive counters for the various individuals.

The calculation module 52 alters the values of the interaction counters of active individuals 71. In the presented example, the first individual 21 discusses with the second individual 22. The sensors 3, 4, 5 of the locations in question, 11 and 12 respectively, generate data streams, 61 and 62 respectively, comprising video signals, audio signals, and potentially other parameters that are transmitted to the management and selection module 51 and the calculation module 52. The calculation module 52 may detect the discussion between the individuals based on the data streams 61, 62 that comprise the audio signals generated by microphones 3 that capture the words of the individuals 21 and 22. The calculation module 52 alters the value of the interaction counter of the first individual 21 and the second individual 22, by incrementing it by one unit. The altered value is transmitted to the management and selection module 51, which alters the value of the interaction counters of the first individual 21 and the second individual 22 stored in a database related to the interaction counters 85.

The calculation module 52 may also alter the value of the interaction counter of the passive individuals 72. In the present example, the various individuals 21, 22, 23 and 24 view either the data streams that are presented to them after having been selected by the management and selection module 51, or potentially the data streams that each individual has manually chosen. The calculation module 52 is informed 63 of the data stream viewed by each individual 21, 22, 23 and 24. The calculation module 52 may take this information into account in order to alter the value of the interaction counters of passive individuals 72, by incrementing them by one unit. For example, if the individual 23 views the data stream corresponding to the individual 22 for a duration longer than a threshold (for example, 1 minute), then the interaction counter of the individual 23 relative to the individual 22 is incremented by one unit. The altered value is transmitted to the management and selection module 51, which alters the value of the interaction counter of the third individual 23 stored in a database related to the interaction counters 85.

As an alternative, the calculation module 52 may directly alter the values stored in the database related to the interaction counters 85 without the involvement of the management and selection module 51.

As an alternative, whenever a general interaction counter and specific interaction counters are both used, the conferences are tagged (in the sense that a specific topic will be discussed during the conference) in order for the calculation module to be capable of incrementing the corresponding interaction counters. For example, when the conference is tagged "Monday departmental meeting", only the corresponding interaction counter between two individuals will be incremented, while the interaction counter between two individuals related to the topic "green technologies" will remain unchanged during that specific conference. Finally, in the event that the conference is not tagged, only the general interaction counter between two individuals will be incremented if there is one.

The management and selection module 51 automatically selects the relevant data streams based on the viewing criteria specific to each individual. The selection is made based on the values of the interaction counters in comparison with a threshold defined by each individual. To do so, each individual 21, 22, 23, 24 indicates his or her personal preferences, respectively 91, 92, 93, 94. The preferences may be saved in a database of preferences 95. A preference represents a specific individual's social selection strategy. For instance, a preference may be asking to view the data stream related to the third-party individual to whom the specific individual feels the closest to socially, i.e. the one for whom the specific individual has an interaction counter whose value is the highest. To take another example, a preference may be asking to view the data stream related to the third-party individual that the specific individual doesn't know well or does not know at all (for the purpose of becoming more familiar with that individual), i.e. the one for whom the specific individual has an interaction counter whose value is lowest or zero. Naturally, other, more complex strategies are possible for each individual. For instance, the preferences may be to select individuals who have an average-value interaction counter. It is also possible to switch between individuals who have the highest-valued or lowest-valued interaction counters at a determined frequency, for example every 30 seconds. It is additionally possible to select only individuals who have the highest-valued or lowest-valued specific interaction counters for a particular topic, for example "green technologies" in the context of a general-subject conference. It is additionally possible to combine a determined strategy for a certain duration and then to switch to a random choice from among the individuals participating in the videoconference. More complex strategies reflected in each user's preferences particularly have the advantage of avoiding or limiting the excessive incrementing or reinforcing of some interaction counters.

The preferences are not fixed and may be altered at any time by each individual based on the topic of the conference, the context, or any other event/situation as perceived by each individual in a personalized fashion. Additionally, any individual may ask the management and selection module 51 to present a particular data stream. In such a case, the individual in question manually chooses the data stream, and temporarily ceases to enjoy the automatic selection and presentation of the data stream based on his or her preferences.

Once the selection has been made based on bacteria specific to each individual, the specific data streams 66, 67, 68 are transmitted and presented to the individuals in question 22, 21, 23 and 24, respectively.

Whenever a group of individuals (for example the individuals 23 and 24) have a single viewing means, it is possible to accept the preference of either of the group's individuals, or to define a group preference so that the management and selection module 51 is capable of selecting and presenting the most relevant data stream to the group.

Optionally, the calculation module 52 may also be combined with social connection services 53 accessible over the Internet outside the context of the conference. Social connection services 53 refer to social media or web-based social networks, such as Facebook, Twitter, LinkedIn (all tm). The calculation module 52 may thereby take into account interactions between the individuals outside the context of the conference in order to alter the values of the interaction counters (for example, during an exchange of messages or emails). As an alternative, the calculation module 52 may also be coupled to a telephone operator that counts the interactions between two individuals based on the number of telephone calls and their durations.

The updating of the database 85 that comprises the interaction counters is performed repeatedly, or quasi-continuously. In this way, the device can dynamically maintain the social connections between the individuals and adapt the most relevant data stream for each of the individuals participating in the current conference and in later conferences. This makes it possible to take into account the "past history" of individuals with one another, for future videoconferences.

The Figures and their above descriptions illustrate the invention rather than limit it. In particular, the invention has just been described in connection with a particular example that applies to videoconferencing. Nonetheless, it is obvious for a person skilled in the art that the invention may be extended to other applications, and generally to all applications that require interactions between individuals in different locations remote from one another, for example by social media or Web-based social networks.

Although some Figures show different functional entities as distinct blocks, this does not in any way exclude embodiments of the invention in which a single entity/module performs multiple functions, or multiple entities/modules perform a single function. Thus, the Figures must be considered a highly schematic illustration of the invention. In particular, some functions performed by the control and processing entity 30 might at least partially be delegated to the local processing units 6. The database related to the interaction counters 85 and/or the database of preferences 95 might also be non-centralized databases managed by each of the individuals, for example in a removable storage memory (like a USB key), or in an online account available on a website for each individual.

The symbols of references in the claims are not in any way limiting. The verb "comprise" does not exclude the presence of other elements besides those listed in the claims. The word "a" or "an" preceding an element does not exclude the presence of a plurality of such elements.

The invention claimed is:

1. A teleconferencing method for a teleconferencing device, the device combining multiple individuals in different location over a communication network, the device comprising at least one sensor per location and at least one audio and/or visual playback means (2) per location, the teleconferencing method comprising:
   assigning multiple interaction counters to each of the individuals participating in the teleconference, each interaction counter characterizing interactions between a specific individual and a third-party individual;
   estimating the interactions between the specific individual and the third-party individual based on a measurement of the sensors of the specific individual's location or the third-party individual's location;
   altering a value of the interaction counter corresponding to the interaction between the specific individual and the third-party individual resulting from estimating the interactions, and saving the value of the interaction counter;
   selecting the data streams to be presented to each individual participating in the conference, the data stream presented to a specific individual being related to at least one third-party individual and selected based on the values of the interaction counters in comparison to a threshold defined by the specific individual; and
   presenting the data flow to each individual participating in the teleconference by way of the audio and/or visual playback means.

2. A method according to claim 1, wherein the values assigned to the interaction counters persist over time, particularly from one conference to another.

3. A method according to claim 1, wherein the value of an interaction counter is representative of the existing social connection between the specific individual and the third-party individual.

4. A method according to claim 1, further comprising altering a value of the counter corresponding to the interaction between the specific individual and the third-party individual resulting from interactions measured by social connection services accessible over the Internet outside the context of the conference.

5. A method according to claim 1, wherein selecting the data streams consists of selecting the data stream related to a third-party individual corresponding to a highest interaction counter value.

6. A method according to claim 1, wherein selecting the data streams consists of selecting the data stream related to a third-party individual corresponding to a lowest interaction counter value.

7. A method according to claim 1, wherein the threshold is defined in preferences of the specific individual.

8. A teleconferencing device connecting multiple individuals in different locations over a communication network, the device comprising at least one sensor per location, at least one audio and/or visual playback means per location, and a centralized or distributed control and processing entity, the control and processing unit implementing the teleconferencing method according to claim 1.

9. A computer program product intended to be loaded in a memory of a centralized or distributed control and processing entity of a teleconferencing device, the computer program product comprising software code portions implementing the teleconferencing method according to claim 1 when the program is executed by the control and processing entity.

* * * * *